United States Patent
Shiel

(12) 
(10) Patent No.: US 10,759,081 B2
(45) Date of Patent: Sep. 1, 2020

(54) NON-BINDING FENCE FOR A TABLE SAW

(71) Applicants: Robert Bosch Tool Corporation, Broadview, IL (US); Robert Bosch GmbH, Stuttgart (DE)

(72) Inventor: William J. Shiel, Bartlett, IL (US)

(73) Assignees: Robert Bosch Tool Corporation, Broadview, IL (US); Robert Bosch GmbH, Stuttgart (DE)

(*) Notice: Subject to any disclaimer, the term of this patent is extended or adjusted under 35 U.S.C. 154(b) by 137 days.

(21) Appl. No.: 15/924,443

(22) Filed: Mar. 19, 2018

(65) Prior Publication Data

US 2019/0283267 A1 Sep. 19, 2019

(51) Int. Cl.
*B27B 27/02* (2006.01)
*B23D 45/06* (2006.01)

(52) U.S. Cl.
CPC .............. *B27B 27/02* (2013.01); *B23D 45/06* (2013.01)

(58) Field of Classification Search
CPC ............... Y10T 83/773; Y10T 83/5815; Y10T 83/5851; Y10T 83/7593; Y10T 83/7647; B27B 27/02; B27B 27/00; B27B 27/10; B23D 45/06
See application file for complete search history.

(56) References Cited

U.S. PATENT DOCUMENTS

| | | | |
|---|---|---|---|
| 2,556,548 A | 6/1951 | Modderman | |
| 2,808,084 A * | 10/1957 | Eschenburg | B23Q 3/007 83/438 |
| D449,318 S | 10/2001 | Schoene et al. | |
| 6,360,641 B1 * | 3/2002 | Talesky | B27B 27/02 83/438 |
| 2004/0261591 A1 | 12/2004 | Liao et al. | |
| 2006/0042443 A1 | 3/2006 | Shibata | |
| 2009/0120255 A1 * | 5/2009 | Lee | B27B 27/10 83/438 |
| 2014/0174273 A1 * | 6/2014 | Frolov | B27B 27/08 83/440 |

FOREIGN PATENT DOCUMENTS

KR 20-0387860 6/2005

* cited by examiner

*Primary Examiner* — Phong H Nguyen

(74) *Attorney, Agent, or Firm* — Maginot, Moore & Beck LLP

(57) ABSTRACT

A guide assembly for a saw device includes a pre-load mechanism located at one end and a slide mechanism located at the other end. The slide mechanism establishes two fixed contact points between the guide assembly and a guide rail of the saw device. The pre-load mechanism establishes a third contact point between the guide assembly and another guide rail of the saw device. The guide assembly has an unlocked condition in which the pre-load mechanism continuously generates a first clamping force on the saw device between the third contact point and the two fixed contact points. The first clamping force self-aligns the guide assembly to the saw device and permits slidable adjustment of the guide assembly on the saw device. The guide assembly has a locked condition in which a second clamping force is generated between the contact points and the guide assembly is fixed on the saw device.

20 Claims, 10 Drawing Sheets

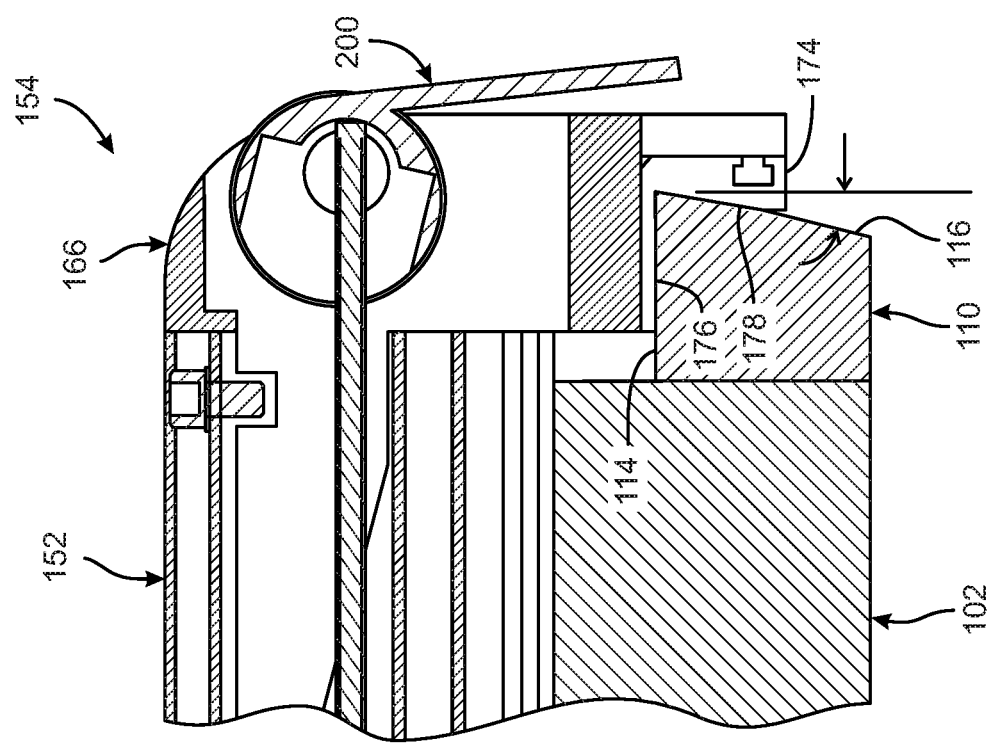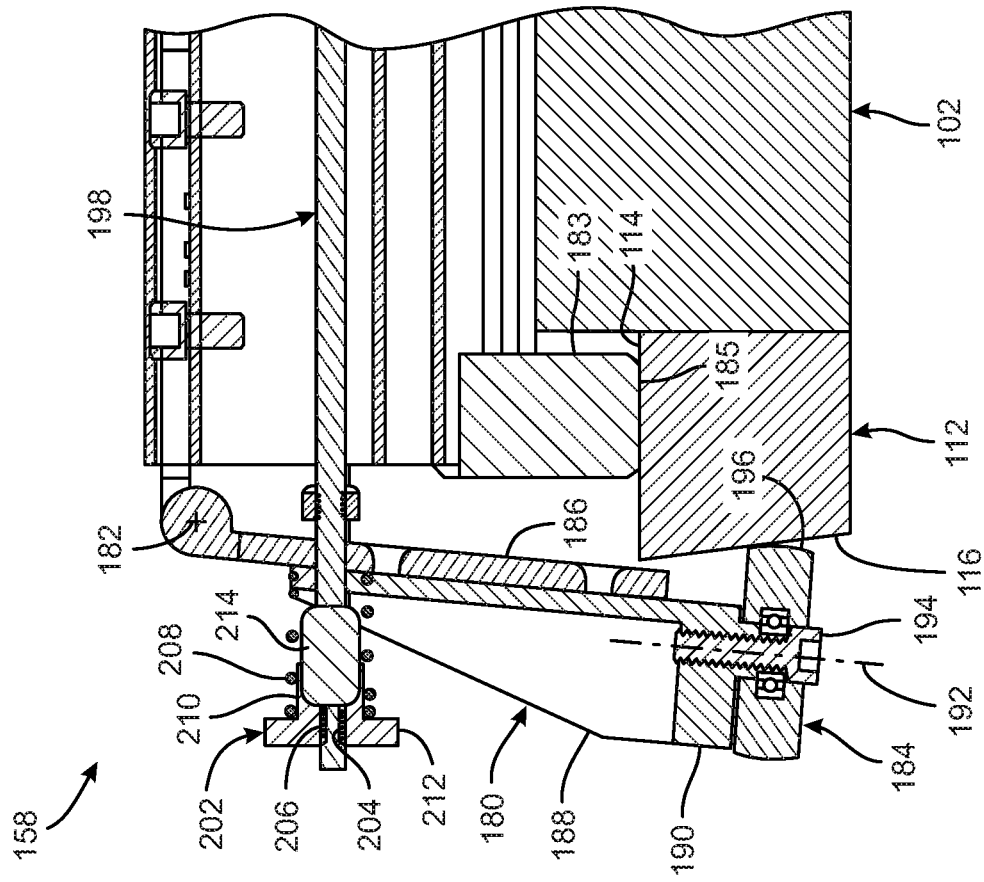
FIG. 5

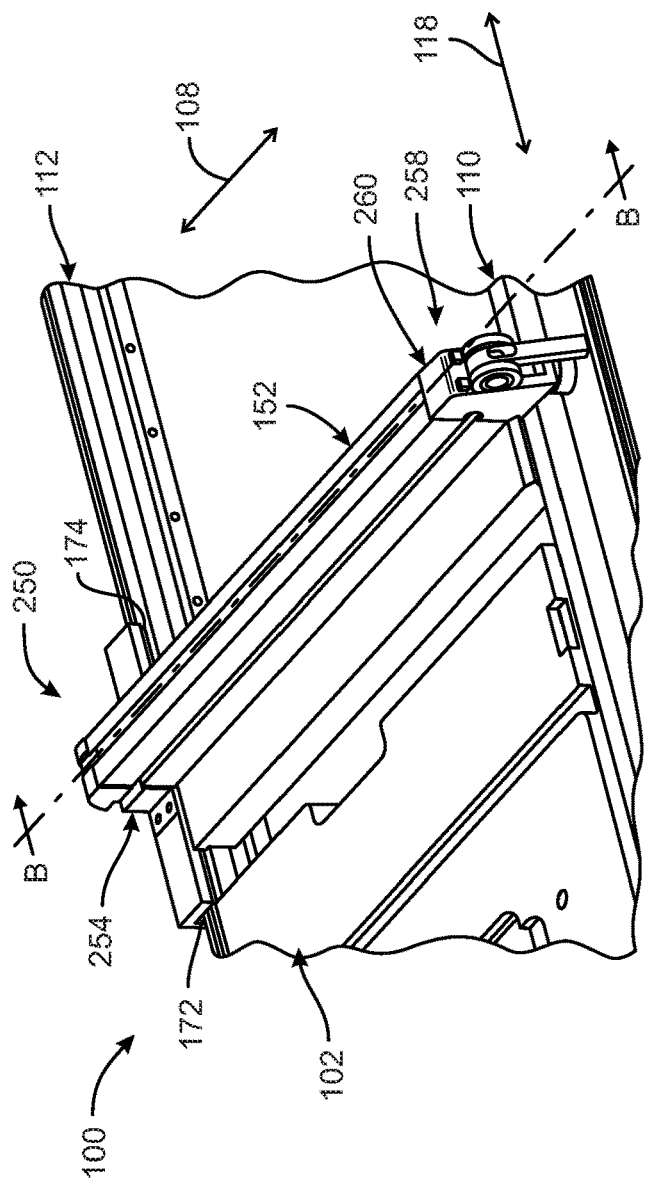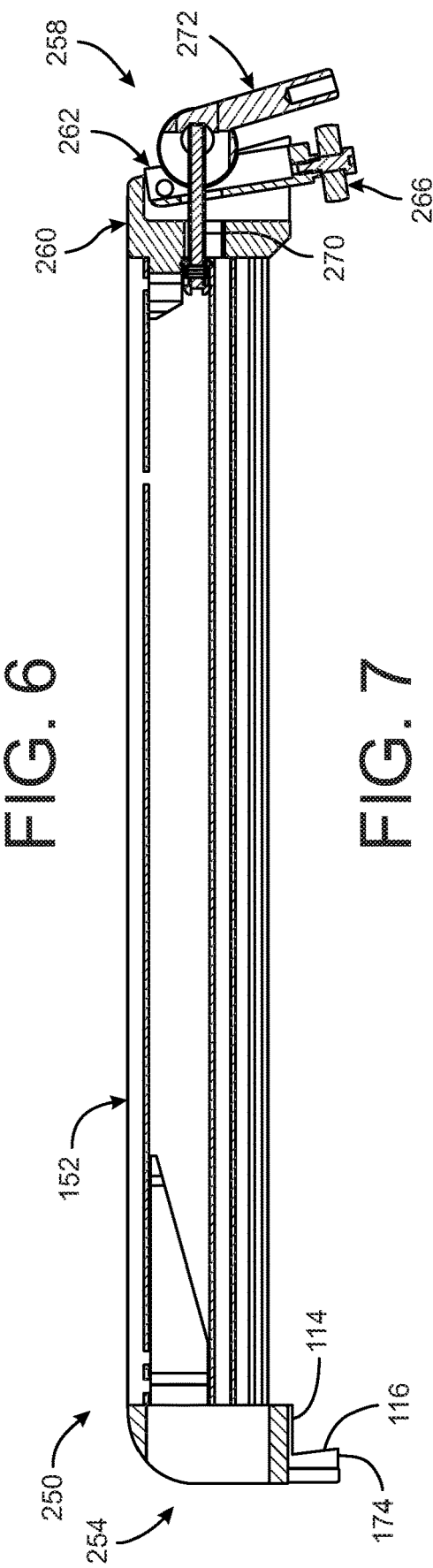

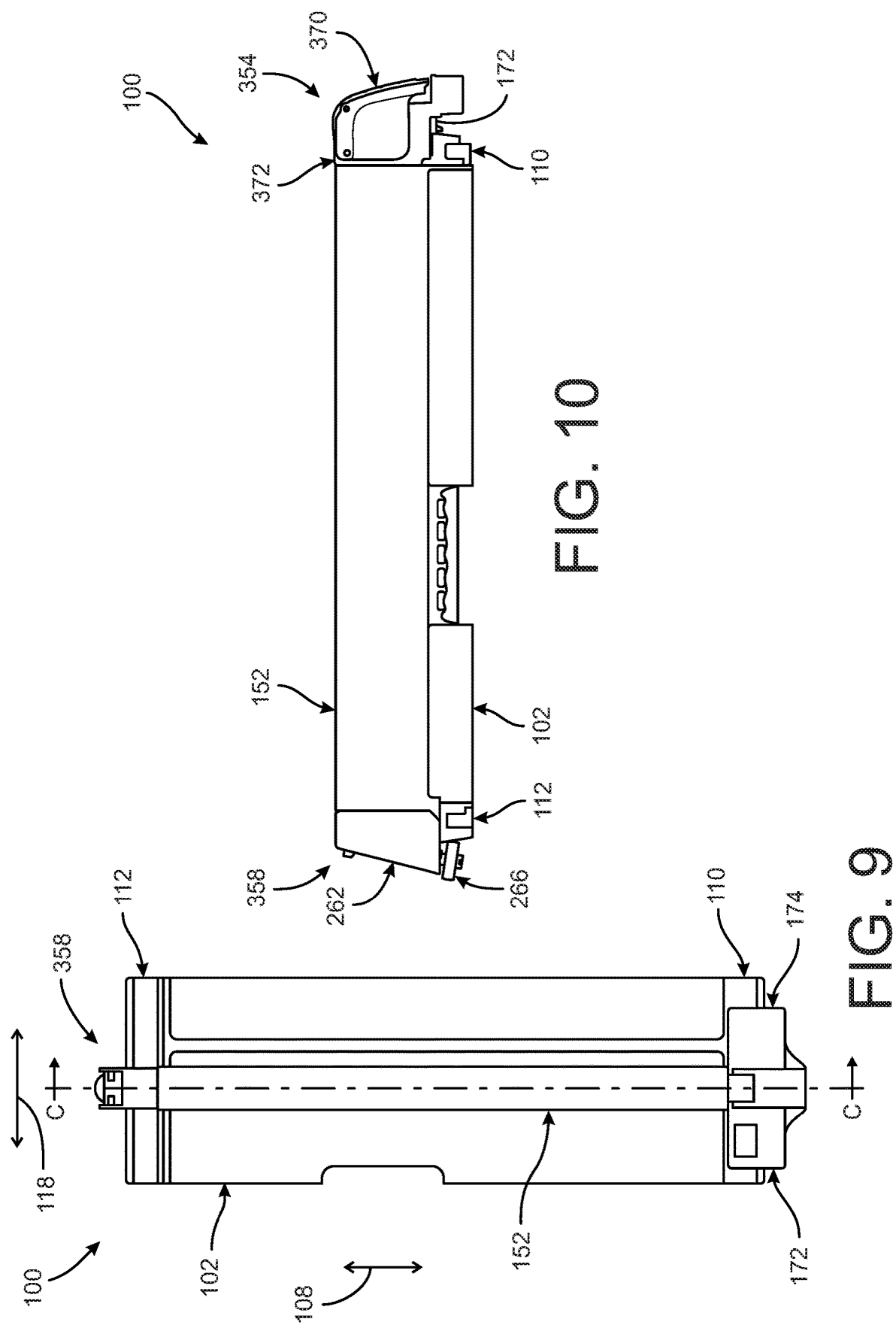

NON-BINDING FENCE FOR A TABLE SAW

FIELD

The disclosure relates generally to power tools, and more particularly to material guides or fences for a saw device that accurately introduce material into and through a cutting instrument.

BACKGROUND

Unless otherwise indicated herein, the materials described in this section are not prior art to the claims in this application and are not admitted to the prior art by inclusion in this section.

To assist users in making accurate cuts, many saw devices are adapted to receive rip fences, also known as material guides or guide assemblies. FIG. 13 depicts a saw device in the form of a table saw that includes a known rip fence 30. The table saw 10 includes a base 12 that supports an enclosure 14. The enclosure 14 houses an electric motor having a shaft upon which a cutting tool, usually a blade 16, is mounted for rotation. A planar surface, commonly referred to as a table 18, is secured to the top of the enclosure 14. The table 18 is usually constructed of a rigid and flat material such as metal, plastic, or fiberglass. The blade 16 projects through an opening 20 in the surface of the table 18. A first fence guide or rail 22 is located toward a front of the table 18 and a second fence guide or rail 24 is located toward a rear of the table 18. The guides 22, 24 can be formed as part of the table 18 or can be separate parts each of which is coupled to the table 18 at the appropriate location.

The rip fence 30 has a clamping system with a first clamp mechanism 32 and a second clamp mechanism 34 that are selectively moveable between a clamped position and an unclamped position. When in the clamped position, the first and second clamp mechanisms 32, 34 engage the guides 22, 24 in such a manner that the fence 30 is fixed in place with respect to the blade 16 and the table 18. When in the unclamped position, the first and second clamp mechanisms 32, 34 disengage entirely from the guides 22, 24 such that the rip fence 30 is free to slide along the table surface. The guides 22, 24 are constructed of a rigid material such as metal or plastic. The guides 22, 24 typically include grooves or other geometric structures that permit the rip fence 30 to be easily attached to and removed, and also permit the fence 30 to slide across the surface of the table 18 for positioning by an operator or user of the table saw 10.

While clamping systems such as that described with reference to FIG. 13 can adequately secure the rip fence to the table, some users find that the position of the rip fence can be moved out of alignment when the fence is clamped to the table. If the rip fence does move during clamping, the clamped location of the fence causes the material being cut to be cut along a line different than that intended by the user. This shift can result in an inaccurate position and angle for the rip fence, which can further result in an inaccurate and unsafe cut. Another issue with known rip fences is that when the position of the rip fence is adjusted, the rip fence can chatter or bind on the guides of the table due to insufficient biasing and loss of contact between the rip fence and the guides. Similar chattering, binding, and/or dislodgment can occur when the user moves these known rip fences from their rear end.

In view of the foregoing, it would be advantageous to provide a rip fence for a table saw where the rip fence provides for increased accuracy in cutting of material. It would also be advantageous if the rip fence could be self-aligned to the table while the position of the fence is adjusted along the table surface. Furthermore, it would be advantageous if the rip fence remained in its desired location when the rip fence is clamped into position on the table.

SUMMARY

In accordance with one embodiment of the present disclosure, there is provided a guide assembly for aligning a workpiece on a table of a table saw. The guide assembly includes an alignment member having a first end and a second end spaced from the first end, a slide mechanism located at the first end of the alignment member, the slide mechanism including two slide contacts spaced bilaterally from the alignment member along a slide axis, and a pre-load mechanism located at the second end of the alignment member, the pre-load mechanism including a third contact movably biased towards the two slide contacts and positioned between the two slide contacts relative to the slide axis, the pre-load mechanism is configured to continuously generate a first clamping force on the table between the third contact and the two slide contacts, the first clamping force enabling slidable adjustment of the guide assembly along the slide axis, and the pre-load mechanism is further configured to selectively generate a second clamping force on the table between the third contact and the two slide contacts, the second clamping force fixing a position of the guide assembly along the slide axis.

In another embodiment, the guide assembly includes an alignment member having a first end and a second end spaced from the first end, a slide mechanism located at the first end of the alignment member, the slide mechanism including a pivotable locking member and two slide contacts spaced bilaterally from the alignment member along a slide axis, and a pre-load mechanism located at the second end of the alignment member, the pre-load mechanism including a third contact that is movably biased towards the two slide contacts and positioned between the two slide contacts along the slide axis, the pre-load mechanism is configured to continuously generate a first clamping force on the table between the third contact and the two slide contacts, the first clamping force drawing the two slide contacts into contact with the table and enabling slidable adjustment of the guide assembly along the slide axis, and the slide mechanism is configured to generate a second clamping force on the table between the locking member and the two slide contacts, the second clamping force fixing a position of the guide assembly on the table along the slide axis.

BRIEF DESCRIPTION OF THE DRAWINGS

FIG. 5 is a section view of the table saw and the rip fence of FIG. 1 taken along line A-A.

FIG. 6 is a front perspective view a table saw including a rip fence according to a second embodiment with the rip fence including a pre-load mechanism and a slide mechanism configured to generate a clamping force on the table saw.

FIG. 7 is a section view of the rip fence of FIG. 6 taken along line B-B.

FIG. 9 is a top view of a table saw including a rip fence according to a third embodiment with the rip fence including a pre-load mechanism and a slide mechanism configured to generate a clamping force on the table saw.

FIG. 10 is a side is a side view of the table saw and the rip fence of FIG. 9.

DESCRIPTION

Figure 1:
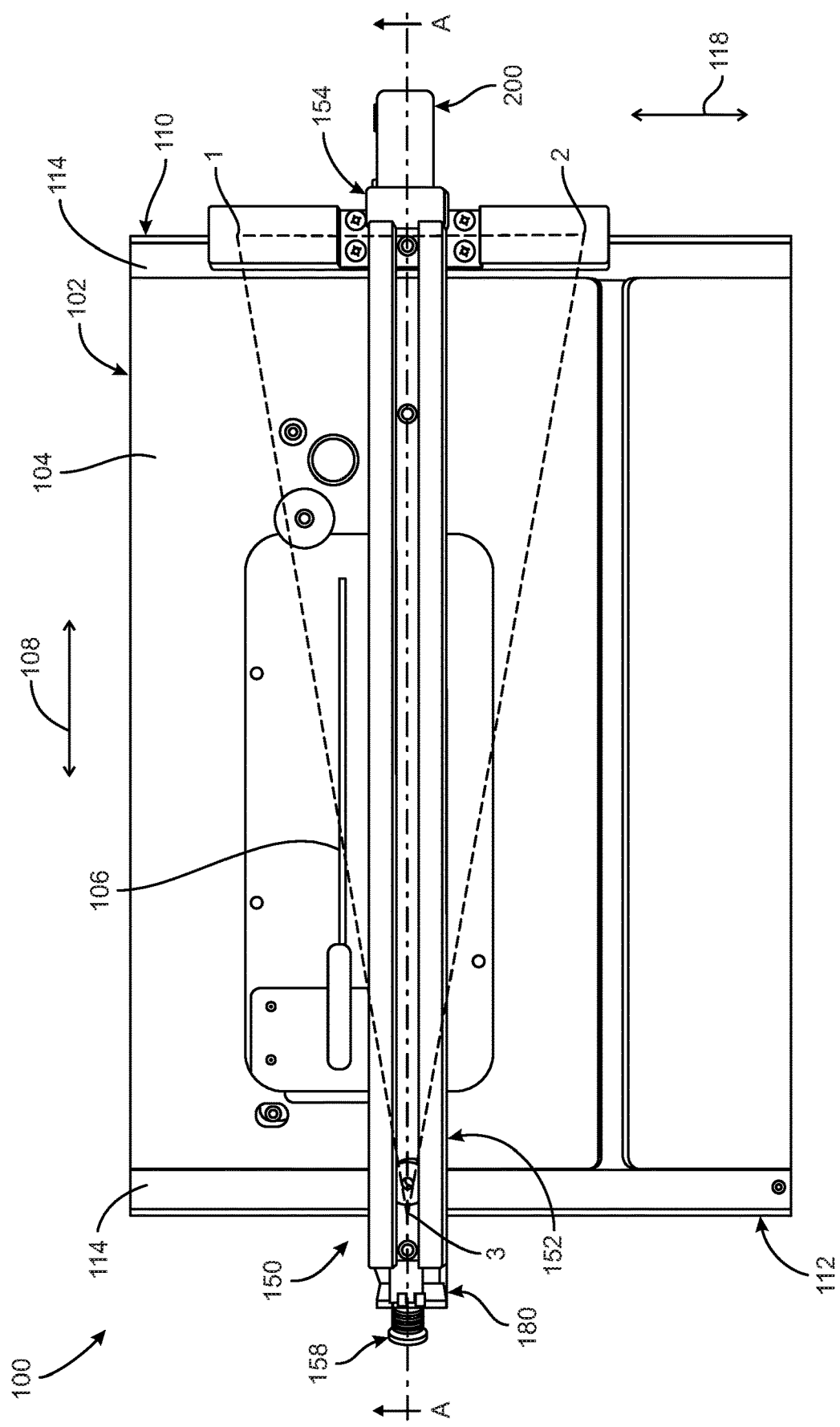
FIG. 1 is a top view of a table saw including a rip fence according to a first embodiment with the rip fence including a pre-load mechanism and a slide mechanism configured to generate a clamping force on the table saw.

For the purposes of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one of ordinary skill in the art to which this disclosure pertains.

FIGS. 1-4 illustrate a guide assembly 150 according to a first embodiment. The guide assembly 150 is shown arranged on a saw device 100 with a table 102. The saw device illustrated in the figures is a table saw 100, although in other embodiments the saw device may be configured as another type of cutting tool in which a guide assembly is used to position a workpiece on a surface relative to a cutting blade. The table 102 defines a planar surface 104 for supporting a workpiece (not shown) and includes an opening 106 (FIG. 1) through which a blade (not shown) projects. The blade establishes a cutting direction 108 of the table saw 100.

The table 102 has a pair of fence guides or rails 110, 112 configured to orient the guide assembly 150 relative to the blade when arranged on the table 102. A first guide 110 is located toward a front of the table 102 and a second guide 112 located toward a back of the table 102. The guides 110, 112 in some embodiments are formed as part of the table 102. In other embodiments, the guides 110, 112 are separate parts each of which is coupled to the table 102 at an appropriate location. The guides 110, 112 are constructed of a rigid material such as metal or plastic. The shape of the guides 110, 112 enables the guide assembly 150 to be easily attached to and removed therefrom. The shape of the guides 110, 112 also permits the guide assembly 150 to slide across the surface 104 of the table 102 for positioning by an operator or user of the table saw 100.

The guides 110, 112 in the embodiment shown have a continuous outer surface such that the outer surface is formed without grooves or cavities that are typical of known guides. The outer surface includes a planar upper surface 114 for supporting a weight of the guide assembly 150 and a planar lateral surface 116 onto which the guide assembly 150 is clamped to attach the guide assembly 150 to the table 102. The upper surface 114 is oriented substantially parallel to the surface 104 of the table. The lateral surface 116 in some embodiments is oriented substantially normal to the cutting direction 108 although in other embodiments the lateral surface 116 has a negative angle. As used herein, a lateral surface with a negative angle means the lateral surface 116 has a planar orientation that imparts a downward force on a cooperating surface of the guide assembly 150 when the guide assembly 150 is arranged on the guides 110, 112 of the table 102. The imparted downward force is configured to cause other surfaces of the guide assembly 150 to be urged downward against other surfaces of the table 102 and the guides 110, 112. An internal region of the guides 110, 112 can be hollow or include any structure that improves the manufacturability, strength, and/or durability of the guides. The guides 110, 112 traverse the width of the table 102 and define a slide axis 118 that is substantially perpendicular to the cutting direction 108 of the blade. The guide assembly 150 is positionable relative to the blade along the slide axis 118.

FIG. 5 illustrates a sectional view of the guide assembly 150 on the table 102 taken along line A-A in FIG. 1. The guide assembly 150 includes an alignment member 152, a slide mechanism 154 located at a first end of the alignment member 152, and a pre-load mechanism 158 located at a second end of the alignment member 152. The alignment member 152 is configured to guide the workpiece on the table 102 and locate the slide mechanism 154 and the pre-load mechanism 158 relative to one another. The alignment member 152 is formed of a channel member or profile that in some embodiments defines an interior space for accommodating or positioning other elements of the guide assembly. The alignment member 152 includes side portions 162, 164 (FIGS. 2-4) each of which defines a substantially planar guiding surface for guiding the workpiece. The side portion 164 generally abuts the workpiece to be cut by the blade. When the guide assembly 150 is accurately positioned with respect to the blade, the planar guiding surface of the side portion 164 is substantially parallel with the cutting direction 108 of the blade to provide for precise cutting of the workpiece.

Figure 3:
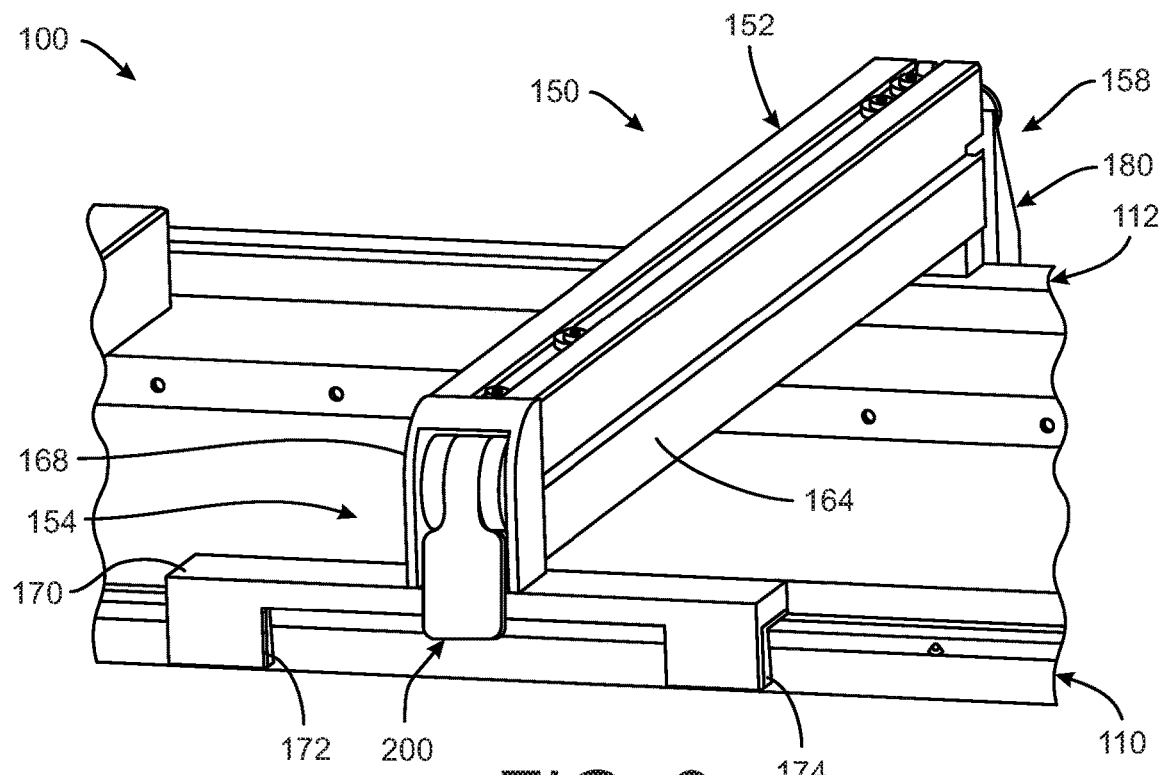
FIG. 3 is a front perspective view of the rip fence of FIG. 1 with two contacts of the slide mechanism in contact with a rail of the table saw.

As best shown in FIG. 3, the slide mechanism 154 includes a housing 166 with a body portion 168 and a flange portion 170. The body portion 168 is coupled to the first end of the alignment member 152. The flange portion 170 is coupled to the body portion 168 and extends bilaterally relative to the alignment member 152 along the slide axis 118. The body portion 168 and the flange portion 170 are fixed with respect to the alignment member 152 to establish alignment of the alignment member 152 relative to the blade via the slide mechanism 154. The slide mechanism 154 further includes two slide contacts 172, 174 that are spaced bilaterally from the alignment member 152 along the slide axis 118. The slide contacts 172, 174 in the embodiment shown are positioned proximate to ends of the flange portion 170 although in other embodiments the slide contacts 172, 174 may be positioned inward from the ends of the flange portion 170. In one embodiment, the slide contacts 172, 174 are spaced bilaterally equally from a plane oriented normal to the slide axis 118 and passing through a center of the alignment member 152.

Figure 2:
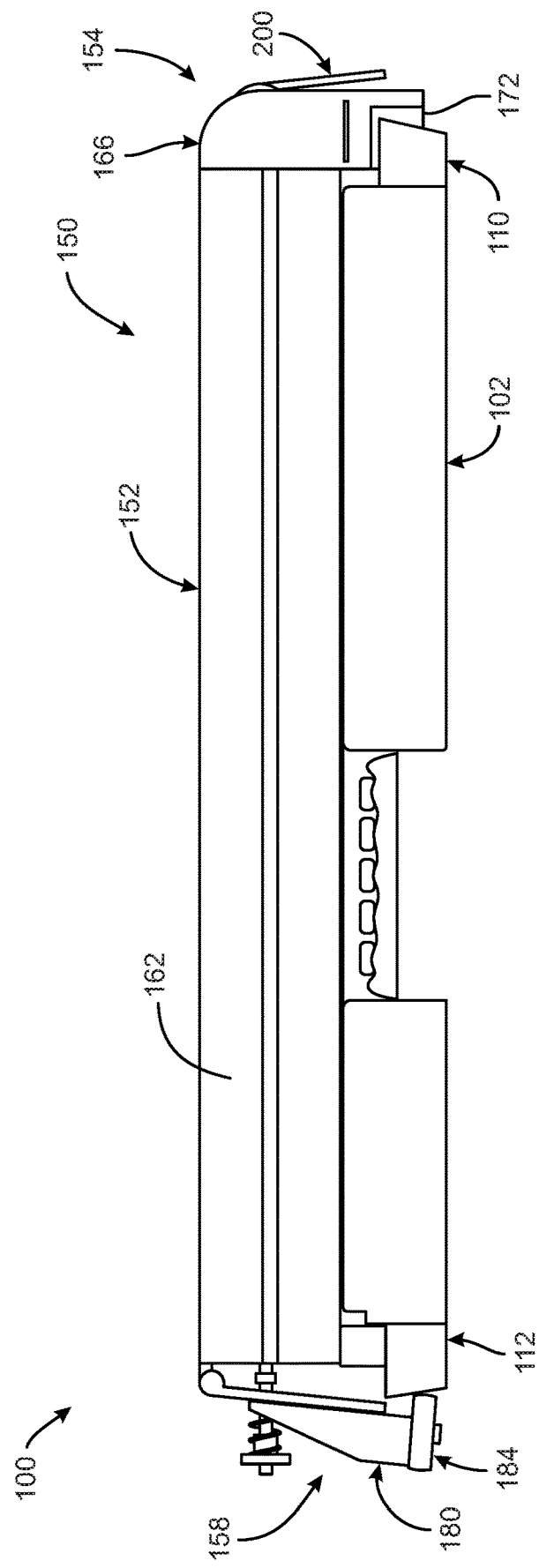
FIG. 2 is a side view of the table saw and the rip fence of FIG. 1.

As best shown in FIGS. 2, 3, and 5, the slide contacts 172, 174 are formed separately from the flange portion 170 and attached directly to the flange portion 170 by a fastener, adhesive, or the like. The slide contacts 172, 174 can be formed from a polymer material such as ultra-high-molecular-weight polyethylene (UHMW) or Delrin®. In other embodiments, the slide contacts 172, 174 are defined by the flange portion 170 such that the slide contacts are integrally formed by the material of the flange portion 170. With reference to FIGS. 2 and 5, the slide contacts 172, 174 each have a planar lower surface 176 and a planar lateral surface 178 that adjoins the lower surface 176. The lower surfaces 176 of the slide contacts 172, 174 are oriented substantially parallel to the upper surfaces 114 of the guides 110, 112. The orientation of the lateral surfaces 178 of the slide contacts 172, 174 correspond substantially to the orientation of the lateral surfaces 116 of the guides 110, 112. The slide contacts 172, 174 establish two distinct contact points between the guide assembly 150 and a corresponding guide 110, 112 of the table 102 to facilitate alignment of the guide assembly 150 relative to the blade. The slide mechanism 154 according to the first embodiment of the guide assembly 150 is positioned at a front of the table 102 such that two slide contacts 172, 174 cooperate with the guide 110 located closest to the user of the table saw 100.

The pre-load mechanism 158 includes a lever 180 pivotally attached at one end to a pivot 182 that is adjacent to the second end of the alignment member 152. A third contact 184 is located at the other end of the lever 180. The lever 180 is configured to rotate the third contact 184 about the pivot 182 toward the two slide contacts 172, 174. The lever 180 in the embodiment shown rotates the third contact 184 in a plane that is normal to the slide axis 118. In other embodiments, the lever 180 rotates the third contact 184 in planes that are oriented differently than a plane normal to the slide axis 118. As best shown in FIG. 1, the lever 180 positions the third contact 184 relative to the slide axis 118 between the two slide contacts 172, 174. In at least one embodiment, the contact point of the third contact 184 on the table 102 is aligned with a plane oriented normal to the slide axis 118 and passing through a center of the alignment member 152. The positions of the two slide contacts 172, 174 and the third contact 184 against the lateral surfaces 116 of the guides 110, 112 form a triangle with vertices at points 1, 2, and 3 as schematically illustrated in FIG. 1. The pre-load mechanism 158 according to the first embodiment of the guide assembly 150 is positioned at a rear of the table 102 such that the third contact 184 cooperates with the lateral surface 116 of the guide 112 located farthest from the user of the table saw 100.

Figure 4:
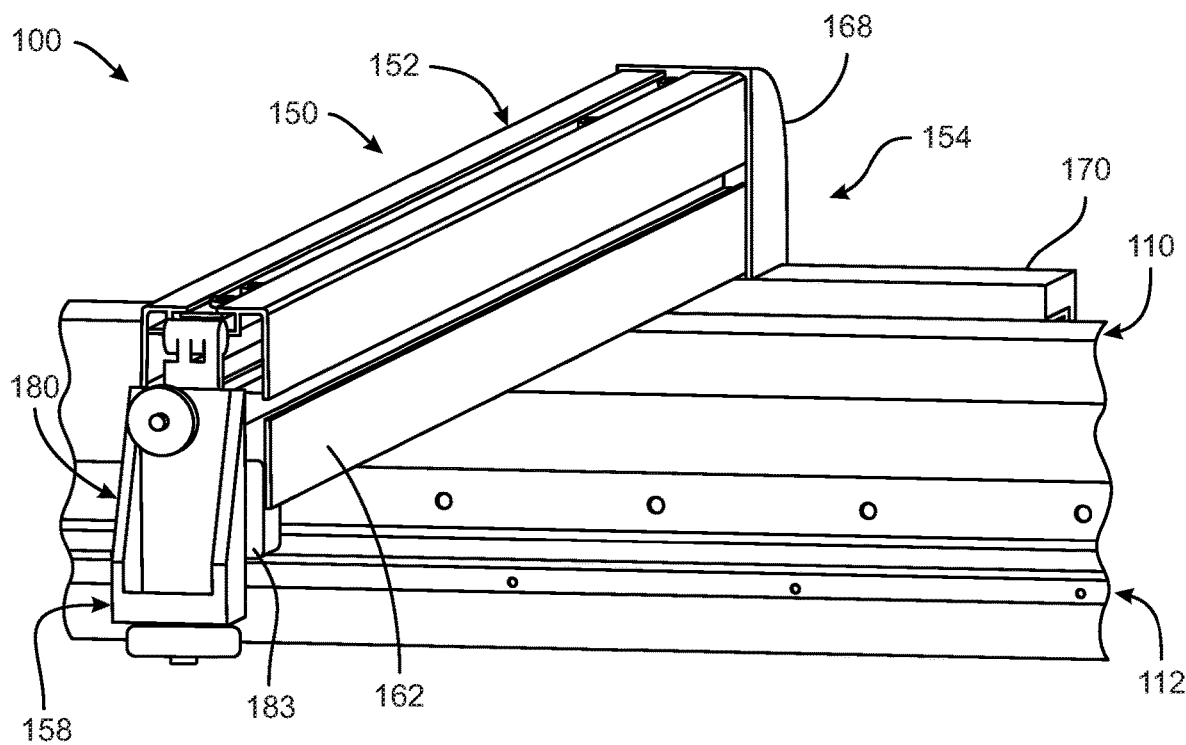
FIG. 4 is rear perspective view of the rip fence of FIG. 1 with a contact of the pre-load mechanism in contact with a rail of the table saw.

With reference to FIGS. 4 and 5, the guide assembly 150 in one embodiment includes a glide block 183 is located proximate to the second end of the alignment member 152 on a lower portion of the alignment member 152. The glide block 183 is disposed inwardly from the pre-load mechanism 158 and has a planar lower surface 185 that is oriented substantially parallel to the upper surface 114 of the guide 112. The glide block 183 is configured to support a weight of the guide assembly 150 on the guide 112 and provide a low resistance to motion when the guide assembly 150 is moved along the slide axis 118. In other embodiments, a lower surface of the alignment member 152 supports the weight of the guide assembly 150 across the table 102 and provides a low resistance to motion when the guide assembly 150 is moved along the slide axis 118.

With reference again to FIG. 5, the lever 180 in one embodiment includes a first plate-like portion 186 that extends from the pivot 182 and a second plate-like portion 188 that is attached to the first plate-like portion 186. The second plate-like portion 188 includes ribs or walls configured to reinforce the first plate-like portion 186 from bending when under load. The second plate-like portion 188 also includes a flange 190 that extends perpendicularly from the first plate-like portion 186 and connects the third contact 190 to the pre-load mechanism 158.

The third contact in the embodiment shown is a wheel 184 oriented for rolling contact with the lateral surface 116 of the guide 112 when the guide assembly 150 is moved along the slide axis 118. The wheel 184 rotates about a rotation axis formed on the pre-load mechanism 158, such as the rotation axis 192 formed by a fastener 194 threaded into the lever 180. As illustrated in FIG. 5, the wheel 184 has a spherical profile 196 when viewed in a plane passing through and aligned with the rotation axis 192 of the wheel 184. The spherical profile 196 allows freedom in the positioning angle of the rotation axis 192 relative to the contact angle of guides 110, 112 so as to achieve linear rolling during movement of the guide assembly 150 along the slide axis 118.

The guide assembly 150 further includes a linkage 198 and a handle 200. The linkage 198 operatively couples the slide mechanism 154 to the pre-load mechanism 158. The handle 200 is operatively coupled to the housing 166 of the slide mechanism 154 and positionable between a first position and a second position. In the embodiment shown, the handle 200 rotates relative to the housing 166 between the first position and the second position. The linkage 198 has a first end operatively coupled to the handle 200 such that a movement of the handle 200 from the first position to the second position moves the linkage 198 in a direction towards the slide mechanism 154 and away from the pre-load mechanism 158. A movement of the handle 200 from the second position to the first position moves the linkage 198 in a direction away from the slide mechanism 154 and towards the pre-load mechanism 158. In one embodiment, the linkage 198 is configured as a tension rod, and the handle 200 is configured as an over-center mechanism.

The linkage 198 passes through the lever 180 of the pre-load mechanism 158 at a point between the pivot 182 and the third contact 184 and a second end of the linkage 198 extends outwardly beyond the lever 180. The linkage 198 includes an adjustment device 202 that is connected to the second end of the linkage 198. The adjustment device 202 is adjustable relative to the linkage 198 along a length of the linkage. In the embodiment shown, the adjustment device 202 has an internal thread that engages a corresponding external thread portion on the linkage 198 near the second end. The linkage 198 further includes a biasing member 208 disposed between the adjustment device 202 and the lever 180. In the embodiment shown, the biasing member is configured as a compression spring 208 with coils that surround the linkage 198. The adjustment device 202 in some embodiments includes a cylindrical body portion 210 and a flange portion 212 disposed at an end of the body portion 210. The flange portion 212 has a diameter that is larger than a diameter of the body portion 210 such that an end of the spring 208 rests against the flange portion 212 and the coils of the spring surround the body portion 210. The biasing member 208 is configured to bias the lever 180 and the third contact 184 towards the two slide contacts 172, 174.

The guide assembly 150 has an unlocked condition that corresponds to the first position of the handle 200 and a locked condition that corresponds to the second position of the handle 200. In the first position of the handle 200, the biasing member 208 has a first compression between the adjusting device 202 and the lever 180 that movably biases the lever 180 and the third contact 184 towards the two slide contacts 172, 174. When the guide assembly 150 is arranged on the table 102 with the handle 200 in the first position, the pre-load mechanism 158 continuously generates a first clamping force on the table between the third contact 184 and the two slide contacts 172, 174. The first clamping force provides a constant pre-load or resting force on the guides 110, 112 of the table 102 with sufficient force to correct any misalignment of the guide assembly 150 relative to blade and ensure contact between the two slide contacts 172, 174 and the guide 110 of the table 102. For instance, if a moment was applied to the guide assembly 150, the first clamping force would act as a correcting force to bring the guide assembly 150 back to square when the moment was reduced or removed. The first clamping force also enables slidable adjustment of the guide assembly 150 along the slide axis 118. The third contact 184 provides a low resistance to travel further facilitating movement of the guide assembly 150 across the table 102 when the handle 200 is in the first position.

As the handle 200 is moved from the first position to the second position, the biasing member 208 is compressed further from the first compression between the adjustment device 202 and the lever 180. The force on the lever 180 during this initial movement of the handle 200 from the first position increases based on the properties of the biasing member 208 taking into account the compression, spring constant, material, and other properties of the biasing member 208. The guide assembly 150 is configured such that the biasing member 208 reaches full compression when the handle is in an intermediate position between the first position and the second position. As used herein, "full compression" of the biasing member means the biasing member cannot be compressed any further. Once the biasing member 208 reaches full compression, further rotation of the handle 200 towards the second position causes the force on the linkage 198 to act directly upon the lever 180, thereby significantly increasing the force on the lever 180 via further rotation of the handle 200.

The linkage 198 in one embodiment further includes a spacer 214 (FIG. 5) located between the adjustment device 202 and the lever 180. The spacer 214 is nested within the biasing member 208 and configured to prevent full compression of the biasing member 208 when the handle 200 is rotated from the first position to the second position. The spacer 214 has a clearance between the adjustment device 202 and the lever 180 when the handle 200 is in the first position. The biasing member 208 in this embodiment also has a first compression between the adjusting device 202 and the lever 180 when the handle 200 is in the first position. The first compression of the biasing member 208 movably biases the lever 180 and the third contact 184 towards the two slide contacts 172, 174.

As the handle 200 is moved from the first position to the second position in this embodiment, the biasing member 208 is compressed further from the first compression between the adjustment device 202 and the lever 180. The guide assembly 150 in this embodiment is configured such that the spacer 214 contacts the adjustment device 202 and the lever 180 when the handle is in an intermediate position between the first position and the second position. In this intermediate position of the handle 200, the spacer 214 prevents the biasing member 208 from reaching its full compression. Further rotation of the handle 200 from the intermediate position towards the second position causes the force on the linkage 198 to act directly upon the lever 180 via the spacer 214, thereby significantly increasing the force on the lever 180 via further rotation of the handle 200.

With reference again to FIGS. 1-5, the following description applies to the guide assembly 150 with or without the spacer 214. When the guide assembly 150 is arranged on the table 102 with the handle 200 in the second position, the pre-load mechanism 158 generates a second clamping force on the table between the third contact 184 and the two slide contacts 172, 174. The second clamping force is greater than the first clamping force and exerts a sufficient force to fix a position of the guide assembly 150 along the slide axis 118. In one embodiment, the second clamping force is a "sufficient force" if it resists movement of the guide assembly 150 when a side load of at least 30 pounds is applied to the guide assembly 150 in the direction of the slide axis 118. The pre-load mechanism 158 is considered to "selectively generate" the second clamping force on the table 102 because the handle 200 is optionally placed in the second position to fix the guide assembly 150 on the table. The pre-load mechanism 158 is considered to "continuously generate" the first clamping force on the table 102 because the handle 200 is positionable only between the first and second positions and the handle 200 must be in the first position to install the guide assembly 150 on the table 102.

Figure 8:
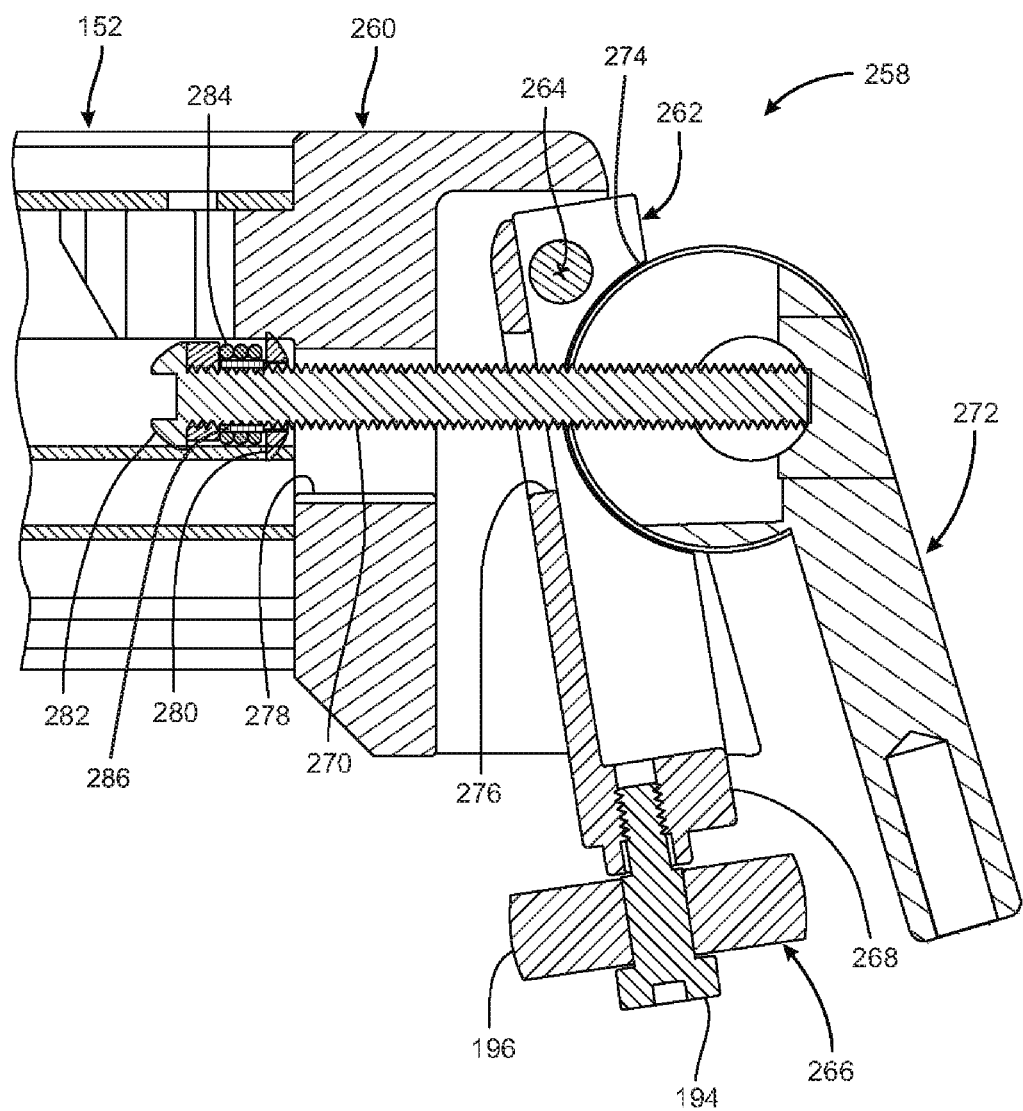
FIG. 8 is an enlarge view of the pre-load mechanism of FIG. 7.
Figure 11:
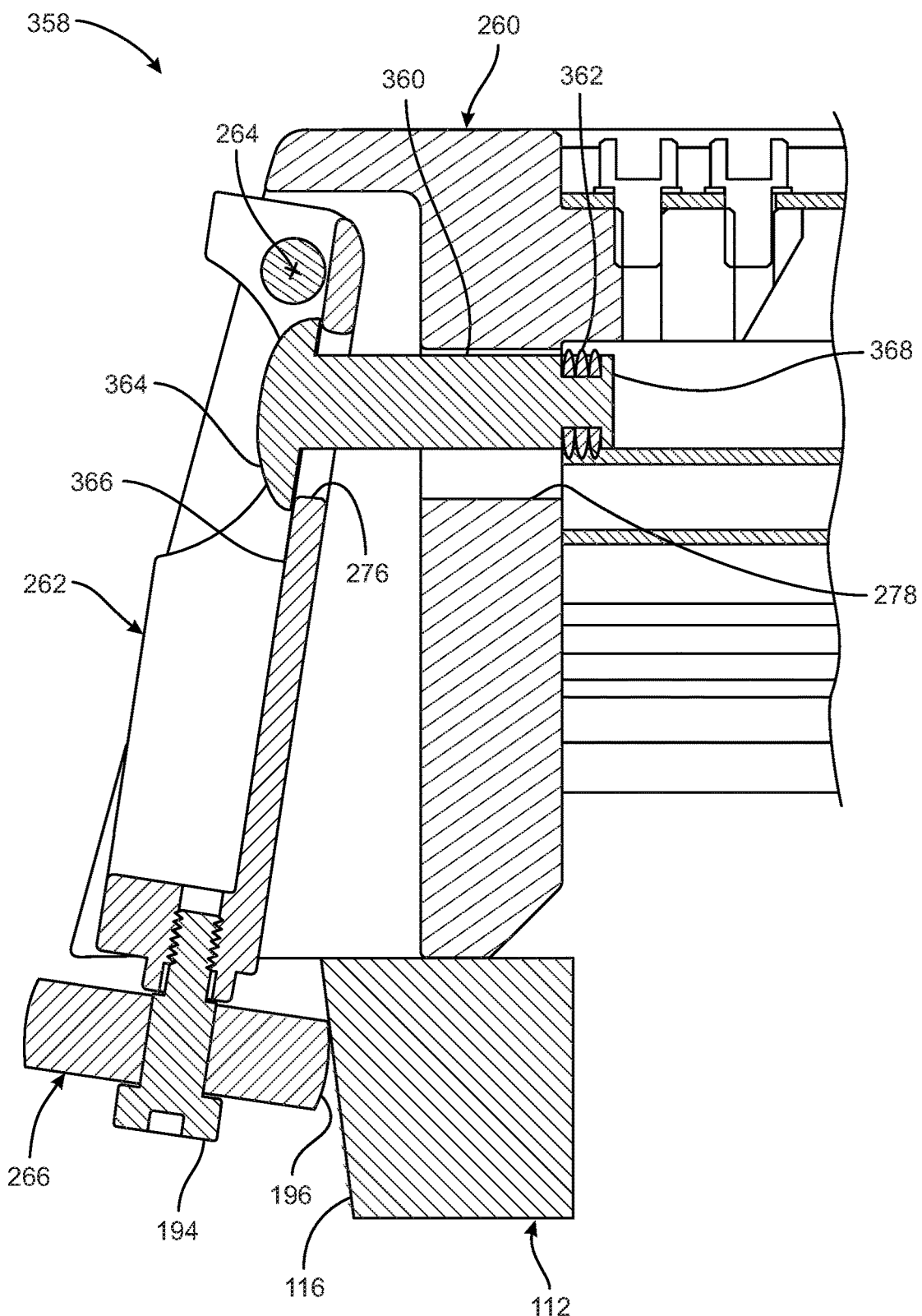
FIG. 11 is an enlarged sectional view of the pre-load mechanism of the rip fence of FIG. 9 taken along line C-C.

FIGS. 6-8 depict a guide assembly 250 according to second embodiment. In the figures, elements of the guide assembly 250 that are similar to elements of the guide assembly 150 of FIGS. 1-5 are designated by like reference numerals. New or modified elements of the guide assembly 250 are designated by new reference numerals. The guide assembly 250 is compatible with the table saw 100 so elements of the table saw depicted in FIGS. 6-8 are designated by like reference numerals.

The guide assembly 250 includes the alignment member 152, a pre-load mechanism 258 located at the first end of the alignment member 152, and a slide mechanism 254 located at the second end of the alignment member 152. The slide mechanism 254 is similar to the slide mechanism 154 of FIGS. 1-5 except the slide mechanism 254 does not include a handle. As illustrated in FIG. 6, the slide mechanism 254 of the guide assembly 250 is positioned at a rear of the table 102 such that two slide contacts 172, 174 cooperate with the guide 112 located farthest from the user of the table saw 100.

With continued reference to FIGS. 6-8, the pre-load mechanism 258 includes a housing 260 that is coupled to the first end of the alignment member 152. The pre-load mechanism 258 further includes a lever 262 pivotally attached at one end to a pivot 264 in the housing 260. A third contact 266 is located at the other end of the lever 262. The lever 262 is configured to rotate the third contact 266 about the pivot 264 toward the two slide contacts 172, 174. The lever 262 of the pre-load mechanism 258 rotates the third contact 266 in planes in essentially the same way as the lever 180 of the pre-load mechanism 158 of FIGS. 1-5 rotates the third contact 184 in planes.

The lever 262 positions the third contact 266 relative to the slide axis 118 between the two slide contacts 172, 174 of the slide mechanism 254. In at least one embodiment, the contact point of the third contact 266 on the table 102 is aligned with a plane oriented normal to the slide axis 118 and passing through a center of the alignment member 152. The positions of the two slide contacts 172, 174 and the third contact 266 against the lateral surfaces 116 of the guides 110, 112 form a triangle in a similar manner as the contacts 172, 174, and 184 of the guide assembly 150 illustrated in FIG. 1. The pre-load mechanism 258 according to the second embodiment of the guide assembly 250 is positioned at a front of the table 102 such that the third contact 266 contacts the lateral surface 116 of the guide 110 located closest the user of the table saw 100 as illustrated in FIG. 6.

With reference to FIGS. 7 and 8, the lever 262 in one embodiment includes has a one-piece, unitary body that extends away from the pivot 264. The lever 262 includes ribs or walls configured to reinforce the lever 262 from bending when under load. The lever 262 further includes a flange portion 268 that connects the third contact 266 to the pre-load mechanism 258. The third contact 266 of the guide assembly 250 is configured in essentially the same manner as the third contact 184 of the guide assembly 150 described with reference to FIGS. 1-5 so no further description is provided herein.

The guide assembly 250 further includes a linkage 270 and a handle 272. The handle 272 is operatively coupled to a receiving region 274 of the lever 262 and is positionable between a first position and a second position. In the embodiment shown, the handle 272 rotates relative to the lever 262 between the first position and the second position. The linkage 270 has a first end operatively coupled to the handle 272. The linkage 270 passes through an opening 276 in the lever 262 of the pre-load mechanism 258 at a point between the pivot 264 and the third contact 266. The linkage 270 also passes through an opening 278 in the housing 260 of the pre-load mechanism 258 and has a second end positioned within an interior space of the alignment member 152. A portion of the linkage 270 proximate to the second end is retained in the alignment member 152. In some embodiments, the linkage portion is retained in the alignment member 152 by the housing 260. In other embodiments, a retention member 280 secured to one or more of the alignment member 152 and the housing 260 retains the linkage portion in the alignment member 152.

When the guide assembly 250 is arranged on the table 102, a movement of the handle 272 from the first position to the second position moves the second end of the linkage 270 in a direction towards the housing 260. A movement of the handle 272 from the second position to the first position moves the second end of the linkage 270 in a direction away from the housing 260. In one embodiment, the linkage 270 is configured as an elongate, threaded fastener, and the handle 272 is configured as an over-center mechanism.

The linkage 270 has a head portion 282 disposed at the second end. The head portion 282 in the embodiment shown has a diameter that is larger than a diameter of the remainder of the linkage 270 between the head portion 282 and the first end coupled to the handle 272. The linkage 270 includes a biasing member 284 disposed between the head portion 282 and the retention member 280 or the housing 260. In the embodiment shown, the biasing member is configured as a compression spring 284 with coils that surround the linkage 270. The biasing member 284 is configured to bias the lever 262 and the third contact 266 towards the two slide contacts 172, 174.

The guide assembly 250 has an unlocked condition that corresponds to the first position of the handle 272 and a locked condition that corresponds to the second position of the handle 272. In the first position of the handle 272, the biasing member 284 has a first compression between the head portion 282 and the retention member 280 or the housing 260 that movably biases the lever 262 and the third contact 266 towards the two slide contacts 172, 174. When the guide assembly 250 is arranged on the table 102 with the handle 272 in the first position, the pre-load mechanism 258 continuously generates a first clamping force on the table between the third contact 266 and the two slide contacts 172, 174. The first clamping force of the guide assembly 250 of FIGS. 6-8 provides the same functionality as described above in connection with the first clamping force of the guide assembly 150 of FIGS. 1-5.

As the handle 272 of the guide assembly 250 is moved from the first position to the second position, the biasing member 284 is compressed further from the first compression between the head portion 282 and the retention member 280 or the housing 260. The force on the lever 262 during this initial movement of the handle 272 from the first position increases based on the properties of the biasing member 284 taking into account the compression, spring constant, material, and other properties of the biasing member 284. The guide assembly 250 is configured such that the biasing member 284 reaches full compression when the handle is in an intermediate position between the first position and the second position. Once the biasing member 284 reaches full compression, further rotation of the handle 272 towards the second position causes the force on the linkage 270 to act directly upon the lever 262 via the handle 272, thereby significantly increasing the force on the lever 262 via further rotation of the handle 272.

In some embodiments, the linkage 270 further includes a spacer 286 (FIG. 8) located between the head portion 282 and the retention member. The spacer 286 is nested within the biasing member 284 and configured to prevent full compression of the biasing member 284 when the handle 272 is rotated from the first position to the second position. The spacer 286 of the guide assembly 250 of FIGS. 6-8 provides the same functionality as described above in connection with the spacer 214 of the guide assembly 150 of FIG. 5.

In embodiments with or without the spacer 286, the pre-load mechanism 258 generates a second clamping force on the table between the third contact 266 and the two slide contacts 172, 174 when the handle 272 in the second position. The second clamping force of the guide assembly 250 of FIGS. 6-8 provides the same functionality as described above in connection with the second clamping force of the guide assembly 150 of FIGS. 1-5.

FIGS. 9-12 depict a guide assembly 350 according to third embodiment. In the figures, elements of the guide assembly 350 that are similar to elements of the guide assembly 150 of FIGS. 1-5 and the guide assembly 250 of FIGS. 6-8 are designated by like reference numerals. New or modified elements of the guide assembly 350 are designated by new reference numerals. The guide assembly 350 is compatible with the table saw 100 so elements of the table saw depicted in FIGS. 9-12 are designated by like reference numerals.

The guide assembly 350 includes the alignment member 152, a slide mechanism 354 located at the first end of the alignment member 152, and a pre-load mechanism 358 located at the second end of the alignment member 152. The pre-load mechanism 358 is similar to the pre-load mechanism 258 of FIGS. 6-8 except the pre-load mechanism 358 does not include a handle. The housing 260 of the pre-load mechanism 358 is coupled to the second end of the alignment member 152. The lever 262 is pivotally attached at one end to the pivot 264 in the housing 260, and the third contact 266 is located at the other end of the lever 262.

The lever 262 is configured to rotate the third contact 266 about the pivot 264 toward the slide mechanism 354. The lever 262 of the pre-load mechanism 358 rotates the third contact 266 in planes in essentially the same way as the lever 180 of the pre-load mechanism 158 of FIGS. 1-5 rotates the third contact 184 in planes. The pre-load mechanism 358 is positioned at a rear of the table 102 such that the third contact 266 cooperates with the lateral surface 116 of the guide 112 located farthest from the user of the table saw 100 as illustrated in FIG. 9.

The guide assembly 350 further includes a first linkage 360 and a biasing member 362. The first linkage 360 passes through the opening 276 in the lever 262 of the pre-load mechanism 358 at a point between the pivot 264 and the third contact 266. A first end of the first linkage 360 has a first head portion 364 that abuts an outer surface 366 of the lever 262. The first linkage 360 also passes through the opening 278 in the housing 260 and has a second end positioned within the interior space of the alignment member 152. A portion of the first linkage 360 proximate to the second end is retained in the alignment member 152. In some embodiments, the linkage portion is retained in the alignment member 152 by the housing 260. In other embodiments, a retention member (not shown) secured to one or more of the alignment member 152 and the housing 260 retains the linkage portion in the alignment member 152.

The first linkage 360 also has a second head portion 368 disposed at the second end. The biasing member 362 is disposed between the second head portion 368 and the retention member or the housing 260. In the embodiment shown, the biasing member is configured as a compression spring 362 with coils that surround the first linkage 360. The biasing member 362 is configured to bias the lever 262 and the third contact 266 towards the slide mechanism 354.

Figure 12:
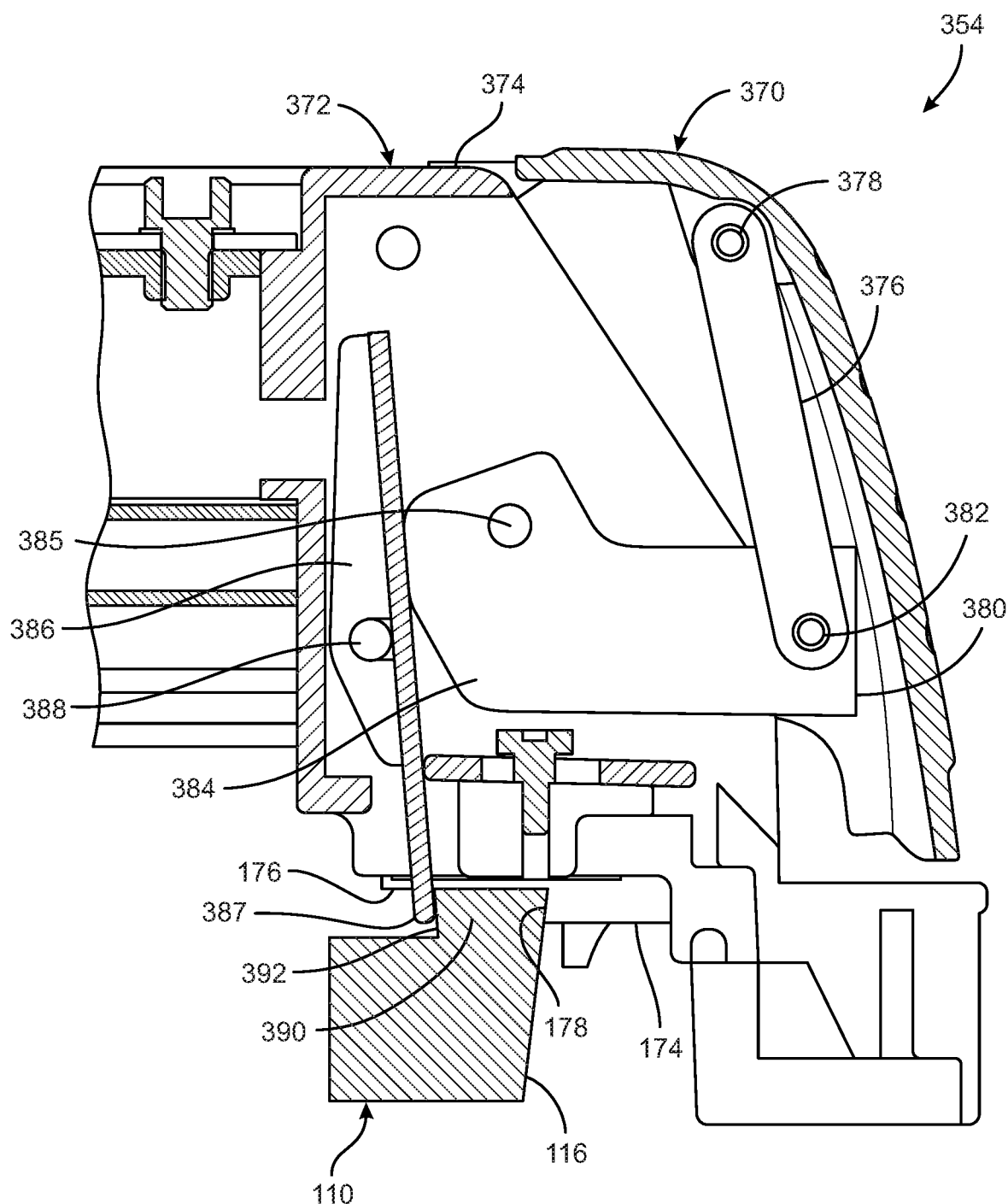
FIG. 12 is an enlarged sectional view of the slide mechanism of the rip fence of FIG. 9 taken along line C-C.
Figure 13:
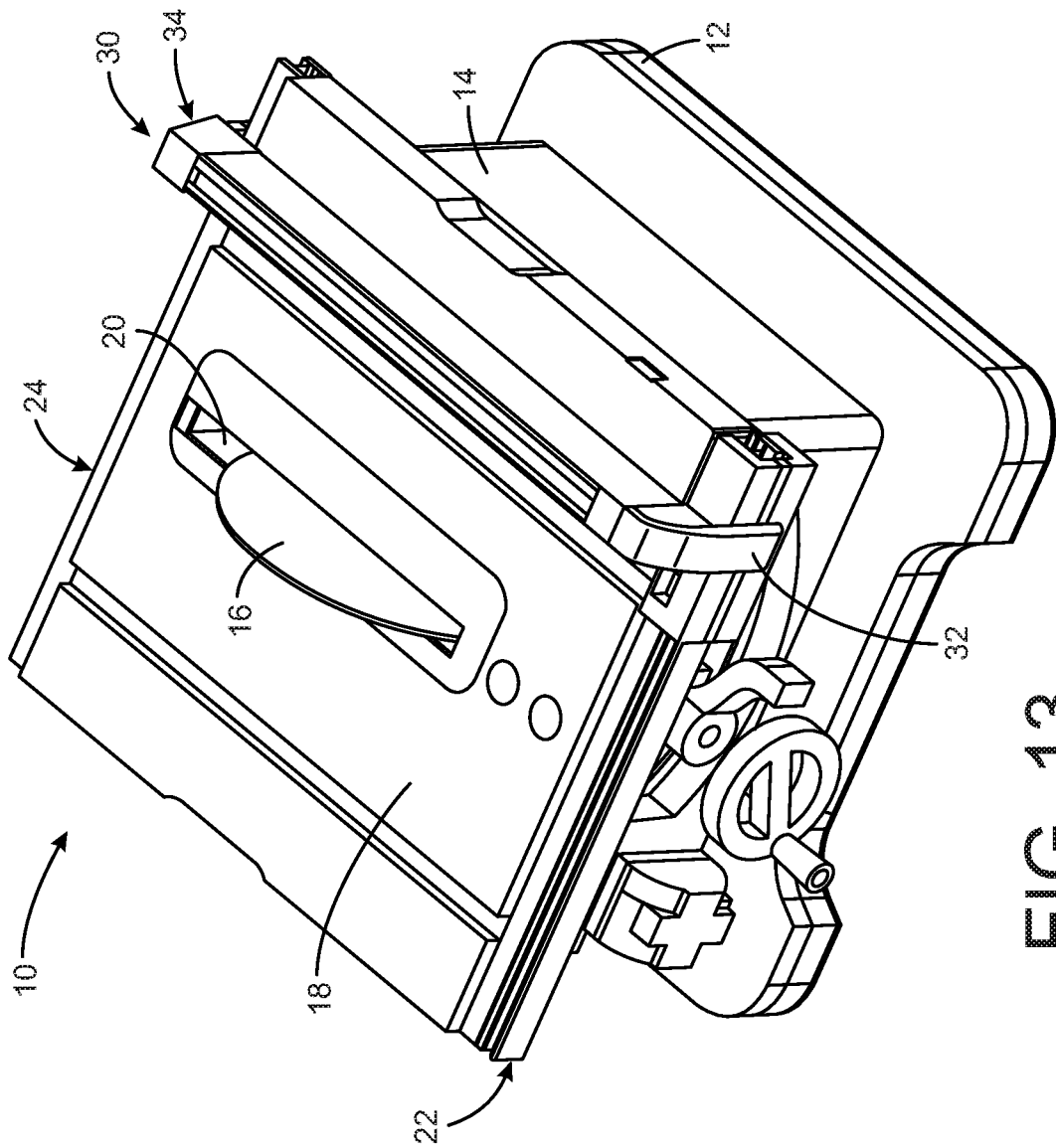
FIG. 13 is a perspective view of a table saw including a known rip fence.

Referring now to FIG. 12, the slide mechanism 354 includes a movable handle portion 370 rotationally coupled to a fixed housing portion 372 via a pivot pin 374. The housing portion 372 is coupled to the first end of the alignment member 152. The housing portion 372 is fixed with respect to the alignment member 152 to establish alignment of the alignment member 152 relative to the blade via the slide mechanism 354. The slide mechanism 354 further includes two slide contacts 172, 174 disposed on a lower end of the housing portion 372. The slide contacts 172, 174 are spaced bilaterally from the alignment member 152 along the slide axis 118 as represented in FIG. 9. The slide contacts of the guide assembly 350 of FIGS. 9-12 have the same attributes and functionality as the slide contacts 172, 174 described in connection with the guide assembly 150 of FIGS. 1-5 so no further description is provided herein.

The handle portion 370 includes a link 376 having a first end pivotally coupled to a pivot pin 378 supported by the handle portion 370. A cam link 380 is coupled to a second end of the link 376 by a pivot pin 382. A locking member 386 is coupled to the housing portion 372 and is support at and rotates about a pivot pin 388. The locking member 386 has an end portion 387 that extends downwardly below the lower end of the housing portion 372 and faces the lateral surfaces 116 of the slide contacts 172, 174. The cam link 380 has a cam portion 384 that rotates about a pivot pin 385 in the housing portion 372 and engages the locking member 386.

The handle portion 370 is rotatable about the pivot 374 between an extended first position (not shown) and a retracted second position as shown in FIG. 12. The locking member 386 has a first position that corresponds to the first position of the handle portion 370 and a second position that corresponds to a second position of the handle portion 370. In the first position of the handle portion 370, the end portion 387 of the locking member 386 has a first spacing of the lateral surfaces 116 of the slide contacts 172, 174 along the cutting direction 108. In the second position of the handle portion 370, the end portion 387 has a second spacing from the lateral surfaces 116 of the slide contacts 172, 174, along the cutting direction 108 with the second spacing being smaller than the first spacing. The slide mechanism 354 is configured such that the end portion 387 and the slide contacts 172, 174 straddle the guide 110 at the front of the table 102. In some embodiments, the end portion 387 and the slide contacts 172, 174 straddle an upward protrusion 390 of the guide 110.

When the guide assembly 350 is arranged on the table 102, the pre-load mechanism 358 continuously generates a first clamping force on the table between the third contact 266 and the two slide contacts 172, 174. The pre-load mechanism 358 generates the first clamping force no matter the position of the handle portion 370 of the slide mechanism 354. The first clamping force of the guide assembly 350 of FIGS. 9-12 provides the same functionality as described above in connection with the first clamping force of the guide assembly 150 of FIGS. 1-5.

With the handle portion 370 in the first position, the end portion 387 of the locking member 386 is spaced from the guide 110 while the two slide contacts 172, 174 are drawn against the lateral surfaces 116 of the guide 110 due to the first clamping force. The guide assembly 350 is slidably adjustable along the slide axis under the first clamping force. To secure the guide assembly 350 to the table 102, the handle portion 370 is rotated into the second position, which due to the operative connections among the link 376, the cam link 380, and the locking member 386 moves the end portion 387 into contact with a lateral surface 392 of the guide 110 that is opposite the lateral surface 116 of the guide 110. The slide mechanism 354 generates a second clamping force on the table between the end portion 387 of the locking member 386 and the two slide contacts 172, 174 when the handle portion 370 is in the second position. The second clamping force of the guide assembly 350 of FIGS. 9-12 provides the same functionality as described above in connection with the second clamping force of the guide assembly 150 of FIGS. 1-5.

While multiple embodiments of the guide assembly have been described herein, these embodiments each exhibit some core functionalities. With respect to the first and second embodiments of the guide assembly, the guide assembly uses only three contact points to establish alignment relative to a blade of a saw device in an unlocked, pre-loaded condition of the guide assembly. Two of the contact points are fixed on one side of the guide assembly relative to an alignment member. The third contact point is positioned opposite the fixed contact points on the other side of the guide assembly. The three contact points are the same in both the locked and unlocked conditions of the guide assembly. A biasing force, such as from a spring or gravity, provides the contact pressure on the third contact point in the unlocked condition to maintain squareness of the guide assembly. The fixed contact points rest on a rail or flat surface of the saw device perpendicular to the blade. These fixed contact points establish a T-square position that aligns the guide assembly parallel to the blade. The third contact point is biased in the direction opposite the fixed contact points. The third contact point rests between the fixed contact points in the direction perpendicular to the blade. The pressure on the third contact point, acting opposite the fixed contact points, establishes and maintains the T-square contact of the fixed contact points.

The connection between the third contact point and the fixed contact points is the alignment member in some embodiments or a linkage such as a tension rod in other embodiments. In embodiments with the tension rod, the tension rod is in tension from a biasing member at a resting state corresponding to the unlocked condition as well as a greater locking tension established by a locking lever in a locked condition of the guide assembly. The resting state tension on the third contact point has the force to correct misalignment of the guide assembly and reposition the guide assembly to the T-square contact on the fixed contact points. If a moment was applied to the guide assembly, the preload force would act as a correcting force bringing the guide assembly back to square when the moment was reduced or removed. The third contact point has a low resistance to travel, such as being configured as a wheel, allowing easy movement of the guide assembly.

When a locking lever is engaged to increase the force between the third contact point and the T-square, the normal forces are increased to a level where the perpendicular sliding friction is high enough to secure the guide assembly for operation. The higher force is achieved by bottoming out the biasing member in some embodiments or by engaging a positive mechanical stop along the travel of the biasing member in other embodiments. The increased normal force on the contact points increases the frictional force opposing travel perpendicular to the blade and locks the guide assembly in position for operation. With no change in the three contact points and no additional contact points added during the locking actuation, there is no movement of the guide assembly between the unlocked to locked condition. The simplification of the contact points permits use of guides or rails that do not have cavities or grooves into which the guide assembly must travel as these ultimately clog with dust on known saw devices.

The rails in some embodiments include a slight inward (or negative) angle to apply a slight downward force to hold the guide assembly onto the saw in the traveling state as well as applying a greater downward force under the greater locking load which adds to the normal force and corresponding frictional force opposing movement in the locked condition. The use of a spherical wheel as the third contact point allows freedom in the positioning angle of the wheel axis relative to the rail contact angle to achieve linear rolling during travel. The guide assembly in some embodiments includes an adjustment device to adjust the timing or positioning of the mechanical contact during the locking phase so as to increase or decrease the locking force of the guide assembly.

With respect to the third embodiment, an independent locking mechanism with a fourth locking contact point is incorporated into the T-square structure opposite the two fixed contact points. As the locking contact point is inside of the 'support base' triangle established by fixed contact points and the third contact point, this locking contact point will not move the guide assembly during the locking phase. The locking contact point locks from within a groove in the rail, yet binding is avoided by the unlocked position of the locking contact point having vertical clearance from the groove. Additionally, the locking contact point being centered on the T-square offers more movement before binding versus being directly behind the contact guide. The addition of the locking contact point provides a greater locking force by using a high friction contact as opposed to a guide or roller. This configuration provides a higher locking force for the guide assembly with lower loads on system components.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A guide assembly for aligning a workpiece on a table of a saw device, comprising:
   an alignment member having a first end and a second end spaced from the first end;
   a slide mechanism located at the first end, the slide mechanism including two slide contacts spaced bilaterally from the alignment member along a slide axis;
   a pre-load mechanism located at the second end, the pre-load mechanism including (i) a third contact that is movable and is positioned between the two slide contacts relative to the slide axis and (ii) a biasing member that imparts a continuous biasing force on the third contact; and
   a handle operatively coupled to the pre-load mechanism and configured to adjust a clamping force of the guide assembly on the table, the third contact continuously biased to move towards the two slide contacts via the biasing member and independent of a position of the handle,
   wherein the pre-load mechanism in a first operating state is configured to generate a first clamping force on the table between the third contact and the two slide contacts, the first clamping force corresponding to the biasing force and enabling slidable adjustment of the guide assembly along the slide axis, and
   wherein the pre-load mechanism in a second operating state is configured to generate a second clamping force on the table between the third contact and the two slide contacts, the second clamping force greater than the first clamping force and fixing a position of the guide assembly along the slide axis.

2. The guide assembly of claim 1, wherein the third contact rotates toward the two slide contacts about a pivot.

3. The guide assembly of claim 2, wherein the third contact rotates in a plane that is normal to the slide axis.

4. The guide assembly of claim 1, further comprising a linkage that operatively couples the pre-load mechanism to one or more of the alignment member and the slide mechanism.

5. The guide assembly of claim 4, wherein the handle is operatively coupled to a first end of the linkage and is positionable between a first position that places the pre-load mechanism in the first operating state and a second position that places the pre-load mechanism in the second operating state.

6. The guide assembly of claim 5, wherein the pre-load mechanism includes a lever that is connected to a pivot at one end and connected to the third contact at the other end.

7. The guide assembly of claim 6, wherein the linkage passes through the lever and the biasing member is configured as a spring that continuously biases the lever and the third contact to move towards the two slide contacts.

8. The guide assembly of claim 7, wherein:
   the handle is operatively coupled to the slide mechanism,
   the linkage includes an adjustment device connected to a second end of the linkage, and
   the spring is disposed between the adjustment device and the lever, the spring having a first compression when the handle is in the first position.

9. The guide assembly of claim 8, wherein the spring reaches full compression when the handle is in an intermediate position between the first position and the second position.

10. The guide assembly of claim 8, wherein:
the linkage includes a spacer disposed between the adjustment device and the lever,
the spacer has a clearance between the adjustment device and the lever when the handle is in the first position, and
the spacer contacts the adjustment device and the lever when the handle is in an intermediate position between the first position and the second position.

11. The guide assembly of claim 7, wherein:
the handle is directly coupled to the lever,
the linkage has a second end retained in the alignment member by a body of the pre-load mechanism, and
the spring is disposed between the second end and the body, the spring having a first compression when the handle is in the first position.

12. The guide assembly of claim 11, wherein the spring reaches full compression when the handle is in an intermediate position between the first position and the second position.

13. The guide assembly of claim 11, wherein:
the linkage includes a spacer disposed between the second end and the body,
the spacer has a clearance between the second end and the body when the handle is in the first position, and
the spacer contacts the second end and the body when the handle is in an intermediate position between the first position and the second position.

14. The guide assembly of claim 1, wherein the third contact is a wheel oriented for rolling contact with the table when the guide assembly is moved along the slide axis.

15. The guide assembly of claim 14, wherein the wheel defines a contact surface portion configured for the rolling contact with the table, the contact surface portion having a spherical profile when viewed in a plane passing through and aligned with a rotation axis of the wheel.

16. The guide assembly of claim 1, wherein:
the two slide contacts are equally spaced from a plane oriented normal to the slide axis and passing through a center of the alignment member, the two slide contacts configured to contact two distinct corresponding regions on a first side of the table, and
the third contact is aligned with the plane, the third contact configured to contact an opposite second side of the table.

17. A guide assembly for aligning a workpiece on a table of a saw device, comprising:
an alignment member having a first end and a second end spaced from the first end;
a slide mechanism located at the first end, the slide mechanism including (i) a pivotable locking member and (ii) two slide contacts spaced bilaterally from the alignment member along a slide axis;
a pre-load mechanism located at the second end, the pre-load mechanism including (i) a third contact that is movable and is positioned between the two slide contacts along the slide axis and (ii) a biasing member that applies a continuous biasing force to the third contact; and
a handle operatively coupled to the slide mechanism and positionable between a first position and a second position, the third contact continuously biased to move towards the two slide contacts via the biasing member for every position of the handle between the first and second positions,
wherein, when the handle is in the first position, the pre-load mechanism is configured to generate a first clamping force on the table between the third contact and the two slide contacts, the first clamping force corresponding to the biasing force, drawing the two slide contacts into contact with the table, and enabling slidable adjustment of the guide assembly along the slide axis, and
wherein, when the handle is in the second position, the slide mechanism is configured to generate a second clamping force on the table, the second clamping force fixing a position of the guide assembly on the table along the slide axis.

18. The guide assembly of claim 17, wherein the pre-load mechanism includes a lever that is connected to a pivot at one end and connected to the third contact at the other end such that the third contact rotates about the pivot toward the two slide contacts.

19. The guide assembly of claim 17, wherein:
the slide mechanism includes a linkage operatively connected at one end to the locking member and at the other end to the handle, and
wherein the locking member is pivotable between an unlocked position corresponding to the first position of the handle and a locked position corresponding to the second position of the handle.

20. The guide assembly of claim 19, wherein:
the locking member in the unlocked position is spaced from a guide of the table on which the two slide contacts are in contact due to the first clamping force, and
the locking member in the locked position is biased against the guide of the table so as to generate the second clamping force on the table.

* * * * *